Figure 1:
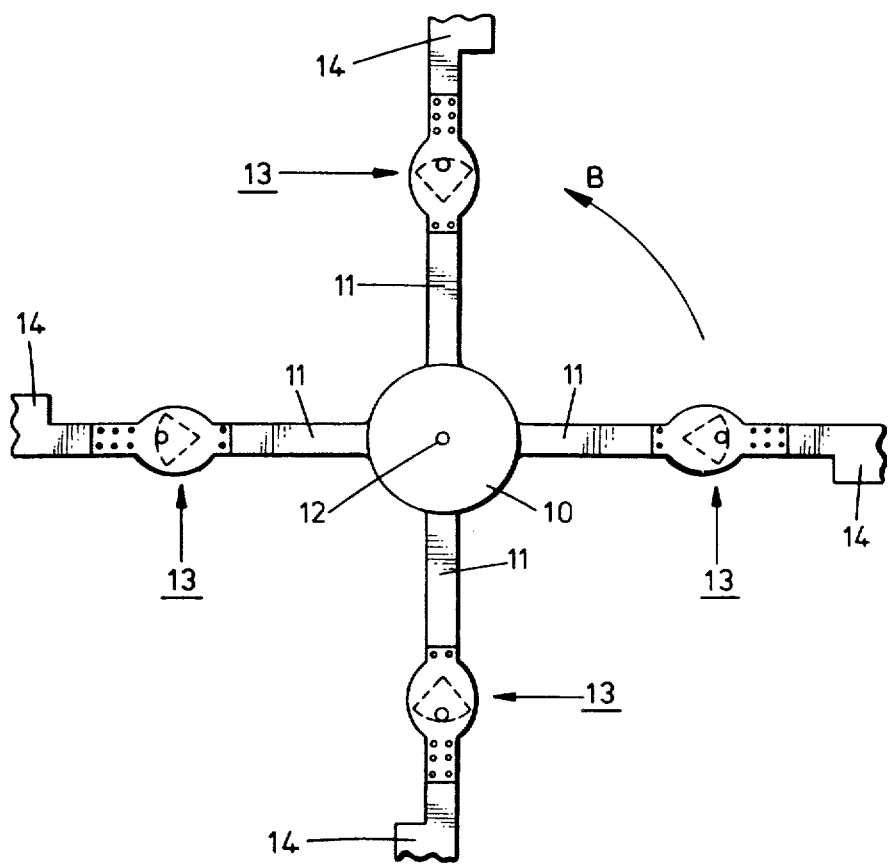

United States Patent [19]
Mills et al.

[11] 3,887,296
[45] June 3, 1975

[54] VIBRATION ABSORBING SYSTEMS

[75] Inventors: Noel Mills, Yeovil; David Ernest Hall Balmford, Sherborne; James Edwin Saunders, Bradford Abbas near Sherborne, all of England

[73] Assignee: Westland Aircraft Limited, Yeovil, England

[22] Filed: Oct. 23, 1973

[21] Appl. No.: 408,748

[30] Foreign Application Priority Data
Nov. 6, 1972 United Kingdom............... 51088/72

[52] U.S. Cl.................................. 416/145; 416/500
[51] Int. Cl............................................. B64c 27/32
[58] Field of Search ....... 416/144, 145, 500; 74/574

[56] References Cited
UNITED STATES PATENTS

| | | | |
|---|---|---|---|
| 2,349,187 | 5/1944 | Meyer | 416/500 X |
| 2,353,681 | 7/1944 | Martin et al. | 416/500 X |
| 2,462,961 | 3/1949 | Harker | 416/500 X |
| 2,462,962 | 3/1949 | Harker | 416/500 X |
| 3,540,809 | 11/1970 | Paul et al. | 416/500 X |

*Primary Examiner*—Everette A. Powell, Jr.
*Attorney, Agent, or Firm*—Larson, Taylor & Hinds

[57] ABSTRACT

A vibration system for a rotary wing aircraft includes at least three vibration absorbers mounted symmetrically about the vertical axis of rotation of the rotors for rotation in a plane generally perpendicular to that axis. Each absorber includes a housing having an aperture formed therein which extends generally parallel to the axis of rotation. The aperture is defined in part by an outboard hollowed surface which faces the axis of rotation, a spherical ball being retained by centrifugal force in contact with that surface. The hollowed surface has a first radius in a first plane perpendicular to the plane of rotation so that forces of a specific frequency in that plane are cancelled or reduced and a second radius in a second plane parallel to the plane of rotation so that forces of a different frequency in the second plane are cancelled or reduced.

4 Claims, 3 Drawing Figures

VIBRATION ABSORBING SYSTEMS

This invention relates to vibration absorbing systems, and particularly to systems for a rotatable body having a plane of rotation generally normal to a rotational axis and which, during operation, is subjected to out-of-balance forces operative in different planes.

In a particular embodiment hereinafter described, a vibration absorbing system according to the invention is adapted for use with a rotatable body in the form of a main rotor assembly of a rotary wing aircraft. A major source of fuselage vibration in such installations is input at a rotor head of more than one component of force, such as in-plane forces operative in the plane of rotation and vertical shear forces operative in a plane generally perpendicular to the plane of rotation. It is known to employ absorption devices to cancel any one of these input forces; however, such systems are unsatisfactory because the vibration level at certain points of the fuselage can remain unaltered due to at least one of the remaining uncancelled component forces.

According to the invention we provide a vibration absorbing system for a rotatable body having a plane of rotation generally perpendicular to a rotational axis, the system comprising a plurality of vibration absorbers mounted symmetrically about the axis for rotation with the body, wherein each absorber includes a spherical ball retained in an aperture in a housing so that, during rotation, the ball is maintained in contact with a hollowed surface of the aperture by centrifugal force, the surface having a radius in a plane generally parallel with the plane of rotation and a radius in a plane generally perpendicular with the plane of rotation.

According to another aspect of the invention we provide, in a rotary wing aircraft having a main rotor system including a rotor hub and a plurality of rotor blades extending radially therefrom, a vibration absorbing system comprising at least three vibration absorbers mounted symmetrically about an axis of rotation of the rotor system for rotation with the rotor system in a plane generally perpendicular to the rotational axis, wherein each vibration absorber comprises a housing having an aperture formed therethrough in a direction generally parallel with the axis of rotation, an outboard surface of the aperture being of hollowed shape formed with a radius in a plane generally parallel with the plane of rotation and a radius in a plane generally perpendicular with the plane of rotation, and a spherical ball retained in the aperture so that during rotation the ball is maintained in contact with the hollowed surface by centrifugal force.

Figure 2:
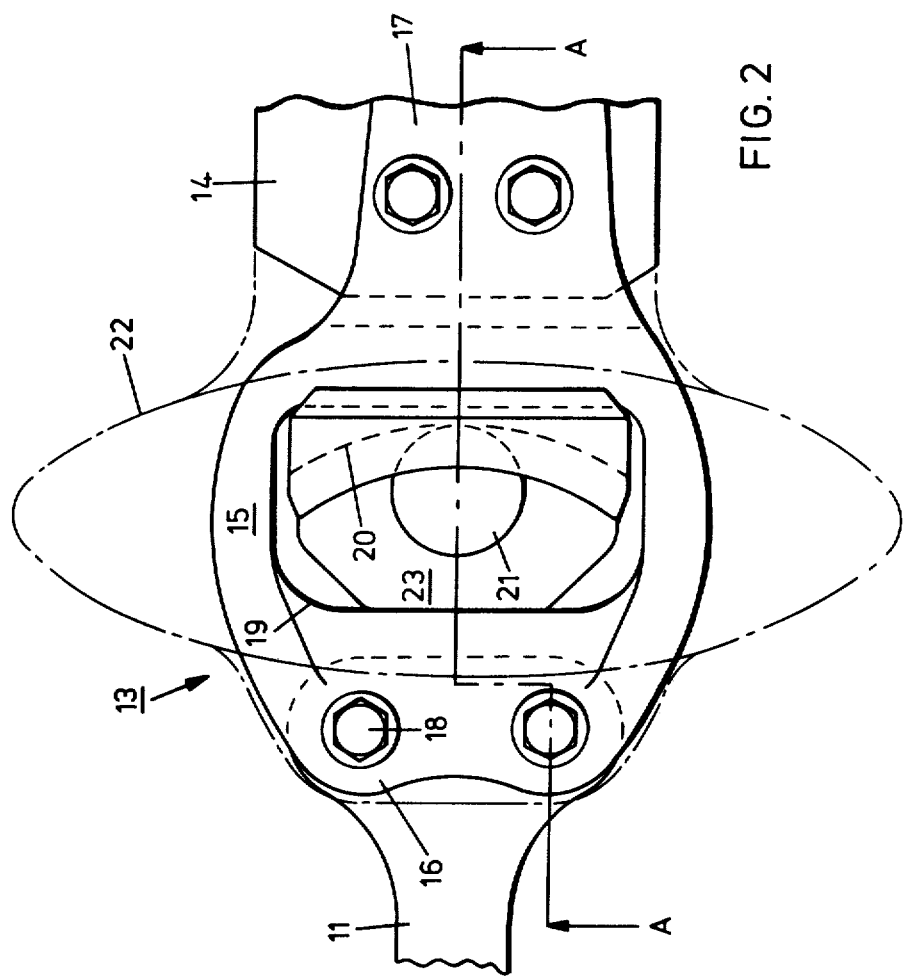
Figure 3:
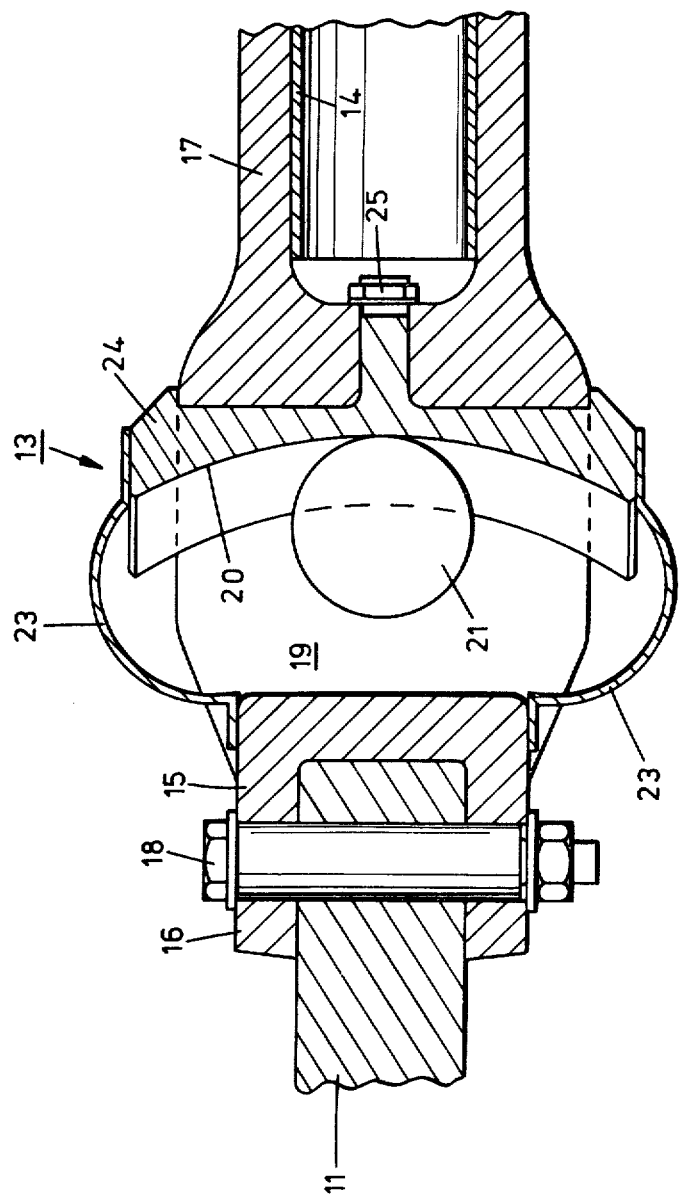

The invention will now be described by way of example only and with reference to the accompanying drawings, in which:

FIG. 1 is a plan view of a main rotor system for a rotary wing aircraft showing one way in which a vibration absorbing system according to the invention can be incorporated, FIG. 2 is a plan view of one of the vibration absorbers forming part of the system, and FIG. 3 is a sectioned view on lines A—A of FIG. 2.

Referring now to FIG. 1, a main rotor assembly for a rotary wing aircraft comprises a hub 10 having four radially extending arms 11 arranged for rotation in the direction of arrow B in a plane generally perpendicular to a rotational axis 12.

A vibration absorber, generally indicated at 13, is secured at the outer end of each arm 11 and is arranged for the attachment of a rotor blade 14.

FIG. 2 is a plan view similar to FIG. 1 showing details of one of the vibration absorbers 13 on an enlarged scale. Referring now to FIGS. 2 and 3, a housing 15 has inner and outer flanged portions 16 and 17 respectively, the inner flanges 16 being secured by bolts 18 to the outer end of the arm 11 and the outer flanges 17 providing a bolted attachment for the rotor blade 14. An aperture 19 is provided through the housing 15 in a direction generally parallel with the rotational axis, and has a hollowed outboard surface 20 formed with a radius in a plane generally parallel with the plane of rotation (as shown in FIG. 2), and with a radius in a plane generally normal to the plane of rotation (as shown in FIG. 3).

A weight in the form of a spherical steel ball 21 is located in the aperture 19 so that during rotation of the absorber 13 the ball 21 is maintained in contact with the surface 20 by centrifugal force. The radii in both planes of the surface 20 are of greater dimension than the radius of the ball 21. If desired, an aerofoil shaped fairing 22 as shown in broken line in FIG. 2 can be fitted around the housing 15 and retained by the bolts 18. Such an arrangement reduces drag during rotation of the vibration absorber 13, and may be of particular benefit in a helicopter installation, as hereinbefore described.

In FIG. 3 the fairing 22 is omitted. Covers 23 are secured on the upper and lower surfaces of the housing 15 to close each end of the aperture 19 and retain the ball 21. The hollowed outboard surface 20 is formed on an insert 24 located in the aperture 19 and retained by a nut 25. This construction eases manufacture and has several advantages in that the hollowed surface 20 can be manufactured from a different material than the housing 15, can be easily renewed, and can be replaced with inserts having different operational characteristics to provide optimum vibration absorbing capabilities in any particular installation.

In operation of the invention, the balls 21 are maintained in contact with the hollowed surface 20 by centrifugal force and are free to move in any combination of directions in a plane parallel to the plane of rotation and in a plane perpendicular with the plane of rotation. Movement of the balls 21 around the radii of the surfaces 20 is initiated by vibrational input forces of differing frequencies and is effective to either cancel or significantly reduce simultaneously the disturbing effect of such forces in both planes.

The vibration absorbing system can be selectively tuned to cancel vibration forces of any particular frequency in either plane of operation by variation of the operating radius from the axis 12, the mass and diameter of the balls 21 and the radii of the hollowed surface 20. It should be noted that the radius of the hollowed surface 20 in the plane parallel with the plane of rotation need not be the same as the radius in the plane perpendicular with the plane of rotation.

The invention provides particular advantages in installations such as a rotor system of a rotary wing aircraft by simultaneously cancelling in-plane and vertical shear vibration input forces in the same vibration absorbing system.

Although one embodiment has been described and illustrated, it is to be understood that modifications may be made without departing from the scope of the invention. For instance, in the application hereinbefore described, the vibration absorbers 13 are shown as a convenient means of attaching the rotor blades 14 to the arms 11; however, the absorbers 13 could be fitted on additional arms secured to the rotor hub for rotation in a plane parallel to the plane of rotation of the arms 11 either coincidental with or above or below the plane of rotation of the arms 11. One criterion regarding the number of vibration absorbers 13 fitted in any installation is one of symmetry, which requires that at least three are used; however, any desired number above three can be fitted and will depend on the characteristics of the rotor system and the provision of the necessary fixing points.

We claim as our invention:

1. In a rotary wing aircraft having a main rotor system including a rotor hub and a plurality of rotor blades extending radially therefrom, a vibration absorbing system including at least three vibration absorbers mounted symmetrically about a generally vertical axis of rotation of the rotor system for rotation in a plane generally perpendicular to the rotational axis, each vibration absorber including a housing having an aperture formed therein which extends in a direction generally parallel with the axis of rotation, the aperture being defined in part by an outboard hollowed surface disposed with the concave portion thereof facing the axis of rotation, a spherical ball retained in the aperture so that during rotation of the rotor system the ball is retained in contact with the hollowed surface by centrifugal force, said hollowed surface having a first radius in a first plane generally perpendicular to the plane of rotation so that during operation the absorber cancels or reduces a vibration force of a particular frequency in said first plane, and a second and different radius in a second plane generally coincident or parallel with the plane of rotation so that during operation the absorber simultaneously cancels or reduces a vibration force of a different frequency in said second plane.

2. A system as claimed in claim 1, wherein each absorber is located at the end of a radially extending arm.

3. A system as claimed in claim 2, wherein opposed inner and outer flanged portions are provided on the housing of each absorber, the inner flanges being connected to the ends of the arm and the outer flanges providing attachment for a main rotor blade.

4. A system as claimed in claim 3, wherein an aerofoil shaped fairing is secured over the housing of each absorber and oriented so as to reduce drag during rotation.

* * * * *